June 8, 1965
R. E. DECKER ETAL
3,187,910
BULK TANK TRUCK AND DISCHARGE MEANS THEREFOR
Filed Feb. 26, 1962
6 Sheets-Sheet 1
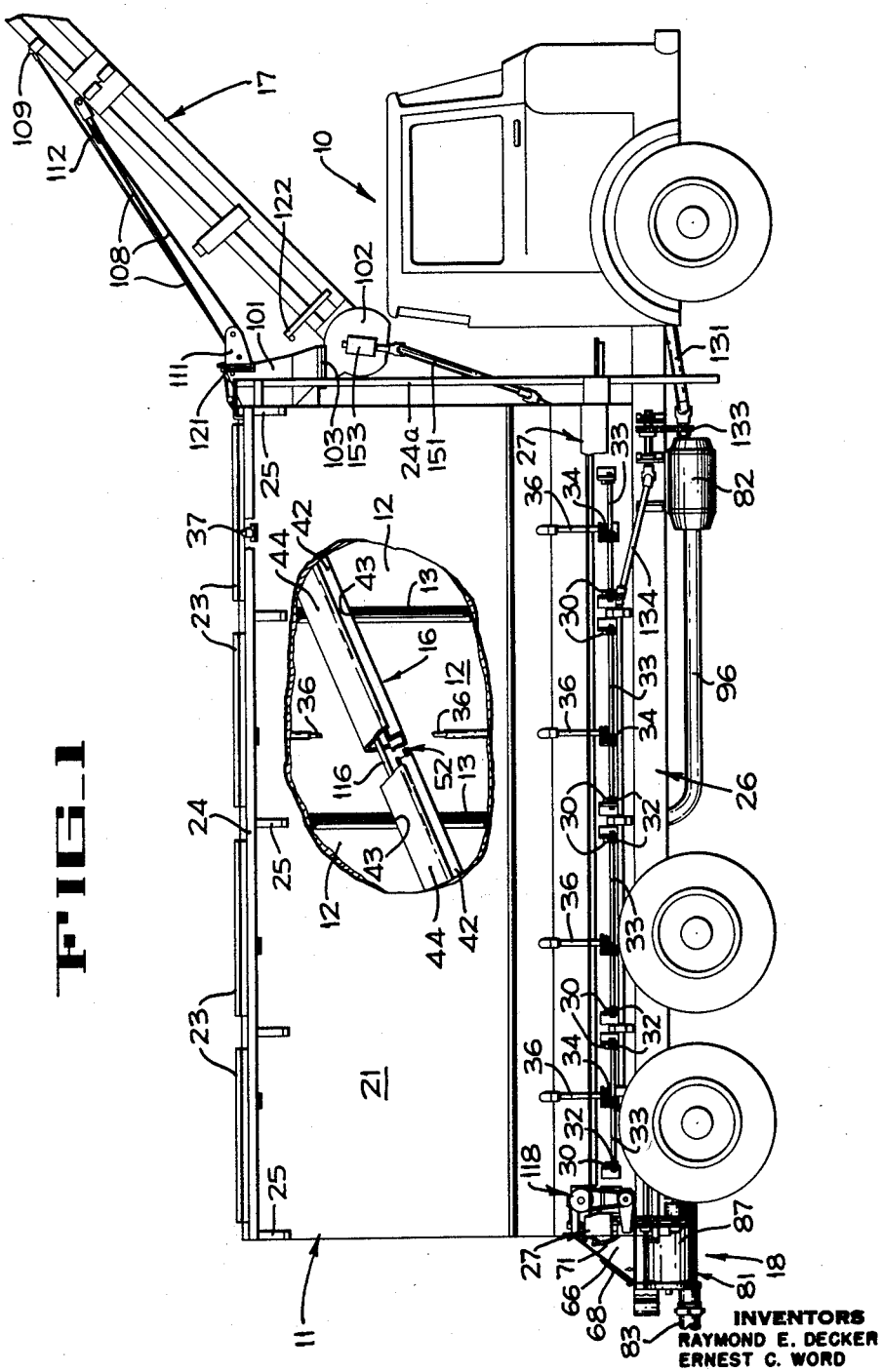
FIG_1
INVENTORS
RAYMOND E. DECKER
ERNEST C. WORD
BY 
ATTORNEY

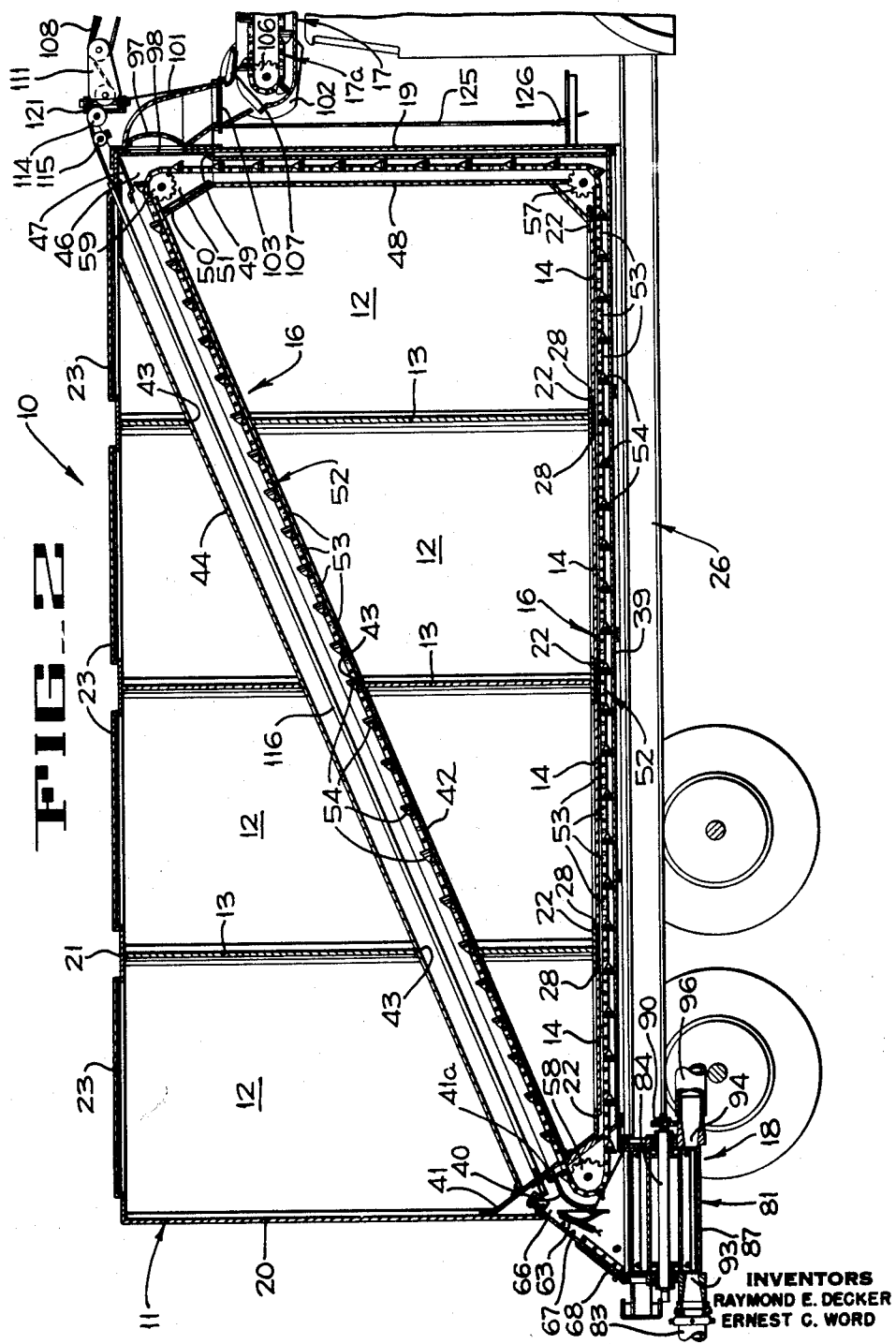

June 8, 1965  R. E. DECKER ETAL  3,187,910
BULK TANK TRUCK AND DISCHARGE MEANS THEREFOR
Filed Feb. 26, 1962  6 Sheets-Sheet 3
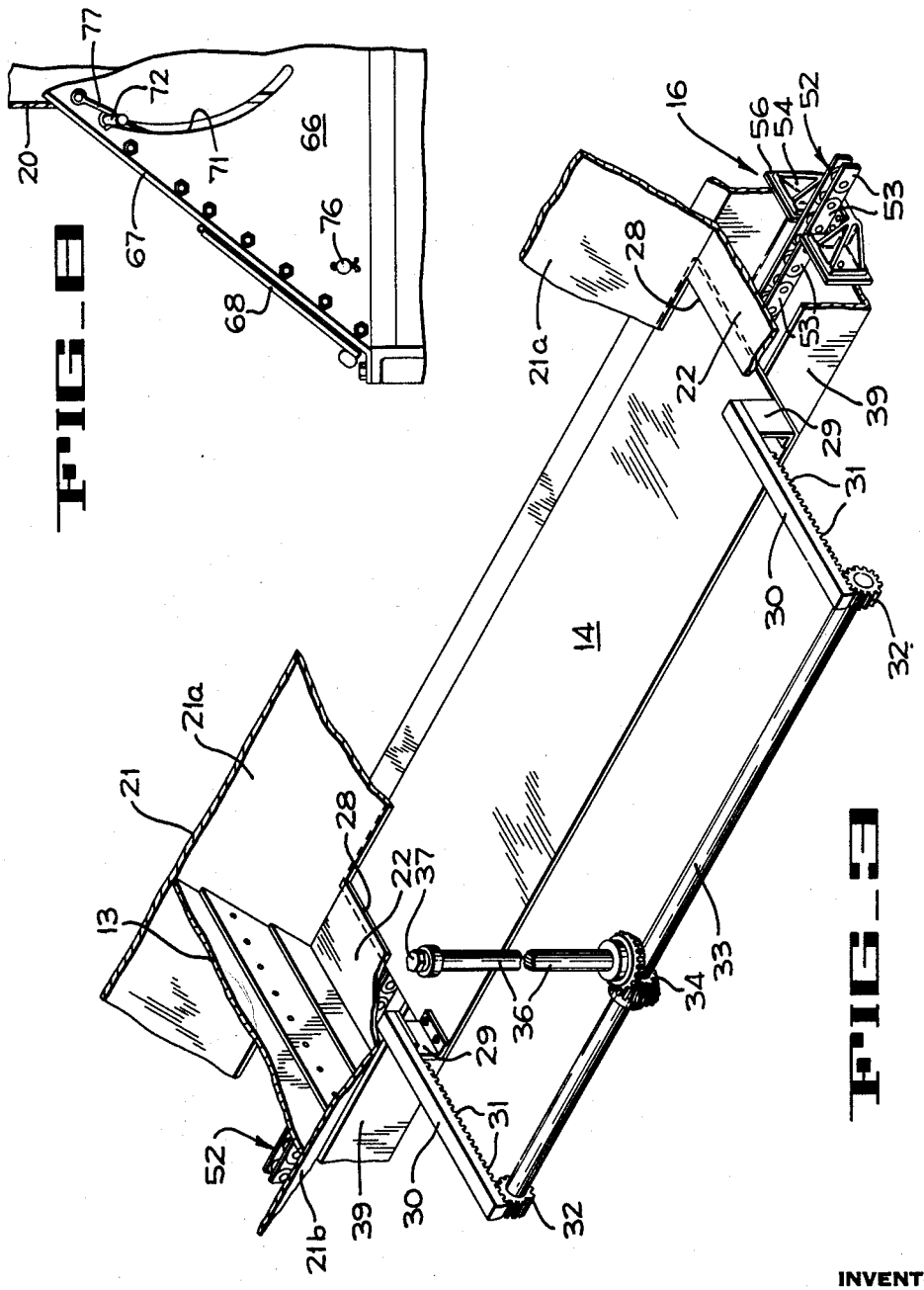
INVENTORS
RAYMOND E. DECKER
ERNEST C. WORD
BY *Hans G. Hoffmeister*
ATTORNEY

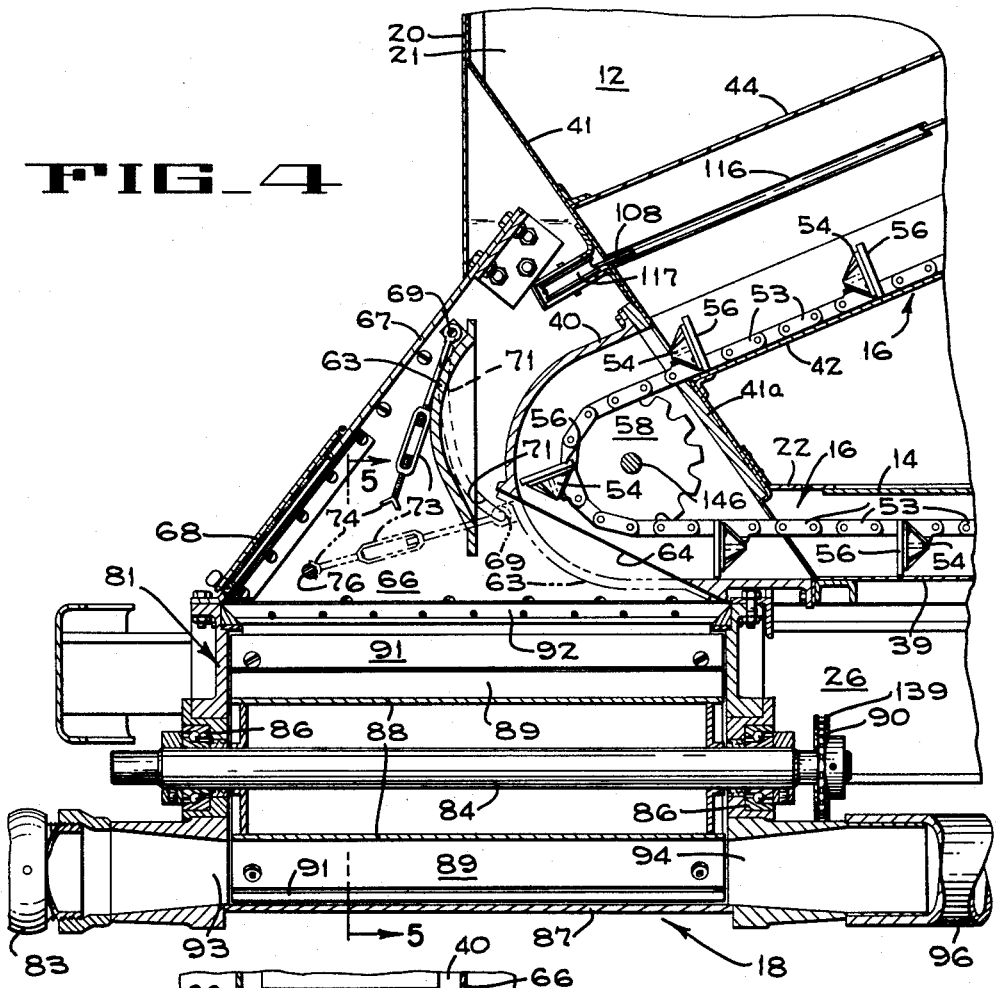
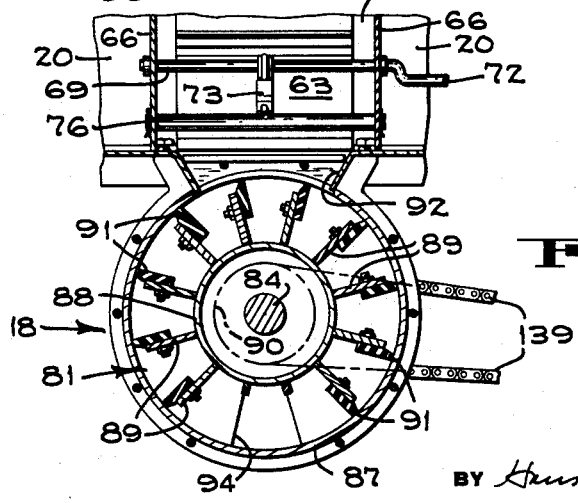

June 8, 1965 R. E. DECKER ETAL 3,187,910
BULK TANK TRUCK AND DISCHARGE MEANS THEREFOR
Filed Feb. 26, 1962 6 Sheets-Sheet 5
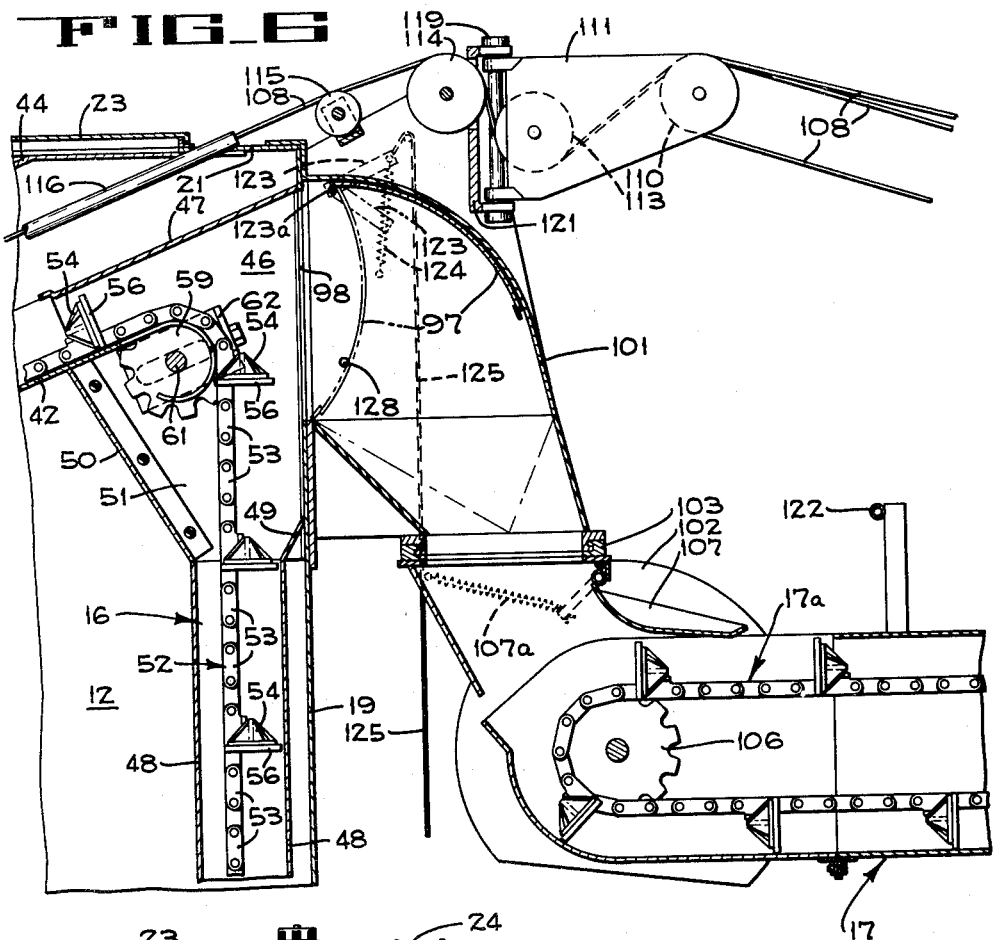
INVENTORS
RAYMOND E. DECKER
ERNEST C. WORD
BY Hans G. Hoffmeister
ATTORNEY

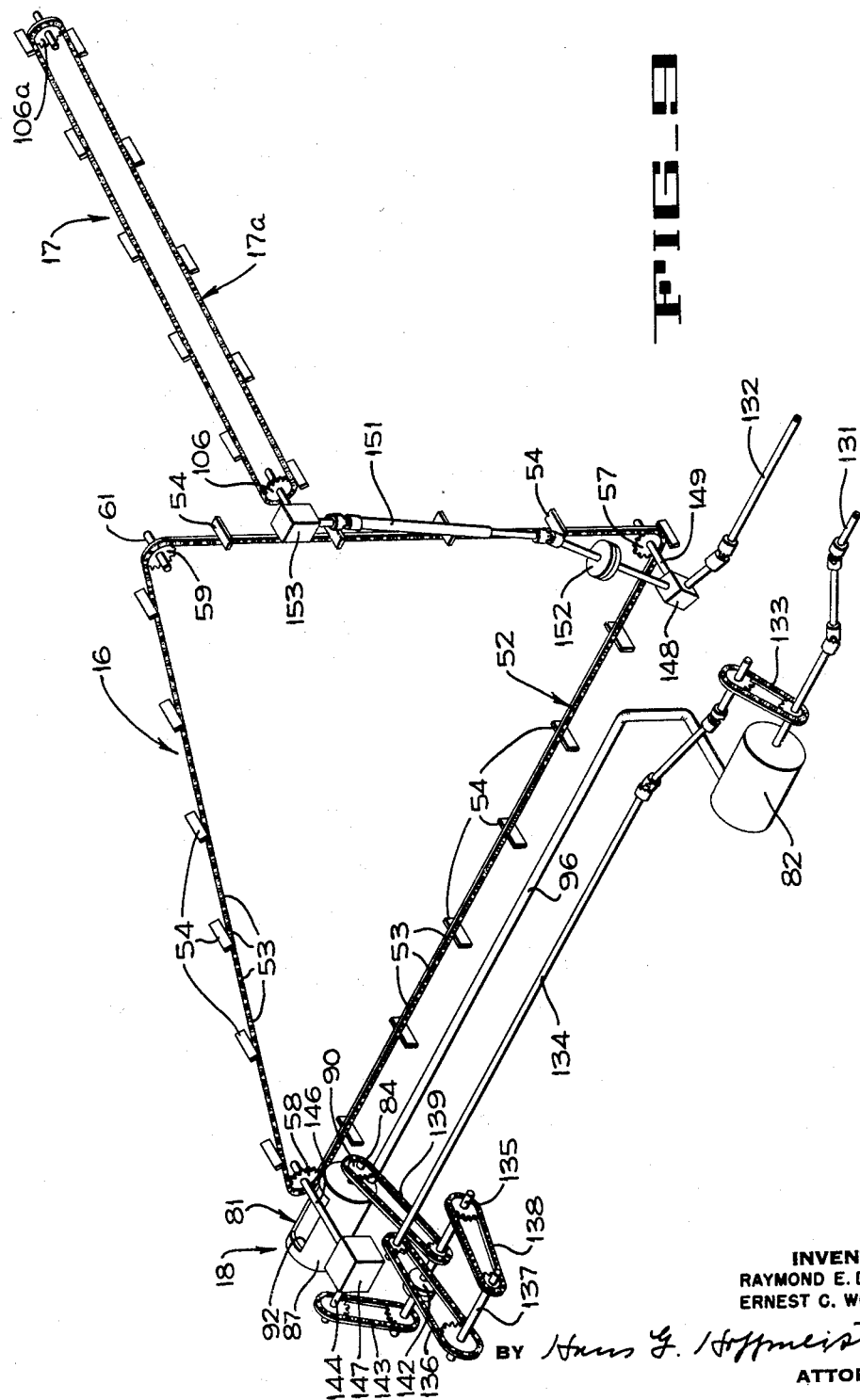

United States Patent Office

3,187,910
Patented June 8, 1965

3,187,910
BULK TANK TRUCK AND DISCHARGE
MEANS THEREFOR
Raymond E. Decker, Riverside, and Ernest C. Word,
Lodi, Calif., assignors to FMC Corporation, San Jose,
Calif., a corporation of Delaware
Filed Feb. 26, 1962, Ser. No. 175,535
2 Claims. (Cl. 214—83.36)

This invention pertains to a bulk tank truck for delivery of loose free-flowing material such as grain or livestock feeds, and more particularly to a means for discharging the same including both a pneumatic and a mechanical discharge system.

Bulk tank trucks of the present day are generally provided with one of a plurality of different means for unloading the feed, grain or other free-flowing material which is stored in tank structures upon the trucks. Such means include high pressure pneumatic systems for blowing the loose material through flexible, hand manipulated hoses and also include universally positionable chutes having a mechanical conveyor therein. Each of these systems has its advantages from the standpoint of economy, speed and ease of operation, and ability to service special types of storage bins or tanks of a multitude of different shapes and sizes. Generally, the mechanical discharge system is preferable from the standpoints of power consumption, feed damage, dust control, noise and rate of discharge, and the pneumatic discharge system is preferable in those cases where access to the storage bins by means of a chute is difficult or impossible. However, no practical method has heretofore been found for combining two such systems in a single truck structure so as to achieve flexibility in the manner of discharging loose bulk material from the truck and to allow a single truck to perform diverse discharging operations. Such flexibility is of particular importance where the storage tank of the truck is divided into a number of separate compartments each adapted to hold a different type of material, and wherein the desirable method of discharge for each of the stored materials is different from the method that is most advantageous for one or more of the other materials.

It is, therefore, an object of the present invention to provide a vehicle having means for effecting both pneumatic and mechanical delivery of a free-flowing type of material transported thereby.

Another object is to provide both a pneumatic discharge system and a mechanical discharge system which will operate in conjunction with an endless conveyor carrying a source of free flowing grain-like material.

Another object is to provide a pair of discharge systems for a bulk tank truck which will both operate from a common power source.

Another object is to provide a simple and effective means within a conveyor system for permitting loose bulk material to be expelled by alternative discharge methods.

These and other objects and advantages of the present invention will become apparent from the following description and the accompanying drawings in which:

FIG. 1 is a side elevation of the tank truck structure of the present invention, certain parts being broken away to show more clearly portions of the truck and tank structure.

FIG. 2 is a longitudinal central vertical section through the tank structure.

FIG. 3 is a fragmentary perspective illustrating one of the gates which control the unloading of material from the tank compartments to a discharge conveyor.

FIG. 4 is an enlarged vertical section of the mechanism at the lower left hand corner of FIG. 2.

FIG. 5 is a vertical section along the line 5—5 of FIG. 4 with certain of the parts being shown in the phantom-line position of FIG. 4.

FIG. 6 is an enlarged vertical section of the mechanism at the upper right hand corner of FIG. 2 with one of the parts being shown in a different operating position than that shown in FIG. 2.

FIG. 7 is a rear elevation of the truck structure with certain portions being broken away to more clearly disclose the structure.

FIG. 8 is an enlarged elevation of a portion of the structure at the lower left hand corner of FIG. 1, particularly illustrating the mechanism for allowing discharge to the pneumatic discharge system.

FIG. 9 is a diagrammatic perspective showing the power system for the truck.

Referring now to the drawings, and particularly to FIGS. 1 and 2, which disclose an embodiment of the present invention, a bulk feed truck 10 is provided with a tank structure 11 which is divided into a number of storage chambers or compartments 12 by partitions 13. Each of these compartments is thus completely separate from the others and may carry a separate type of feed or granular material therein. The unloading of the material from each of the compartments is accomplished by means of separately operable knife-action gates 14 located at the bottom of each of the compartments, and a conveyor system 16 which propels the material to one of two alternative discharge locations. When it is desired to discharge the material through a universally positionable and mechanically operated chute 17 at the front of the vehicle, flow control means are provided to allow the conveyor 16 to discharge onto a discharge conveyor 17a associated with the chute 17. When it is desired to discharge the material through a pneumatic discharge system 18 at the rear of the vehicle, another separately operable flow control means is provided to allow the conveyor 16 to discharge into the pneumatic system. In actual practice, only one of the two discharge systems will be used during any single operation and accordingly, only one of the flow control mechanisms is in operation during discharge of material from the truck.

The tank 11 is comprised of a flat front wall 19, a flat rear wall 20, and a body section 21 which is partially elliptical in transverse cross-section, as seen in FIG. 7, and has downwardly and inwardly inclined lower wall portions 21a and 21b that are connected at their lower ends by a narrow flat floor 22 (FIG. 3). The tank also is provided with a plurality of hatches 23 each of which is located on the top of the tank structure over an opening in one of the compartments 12 to facilitate the loading of the truck. A catwalk 24 is mounted along the top side of the tank by means of brackets 25 to accommodate an operator during the loading operation, and a ladder 24a is fastened to the forward wall of the tank to provide access to the catwalk. The tank is supported upon the truck frame structure 26 by means of a supporting structure 27 which is flanged to support the sloping sides of the tank and rests upon and is secured to the frame 26.

In order to unload the material from within each of the compartments 12, the knife-action gates 14 are positioned beneath each of the compartments, as previously mentioned, each gate being disposed in continuous slidable contact with the undersurface of the floor 22 of the tank structure and underlying a rectangular opening 28 in the floor, as best seen in FIG. 3. The gates are comprised of flat, rigid metallic members and are connected by means of angle irons 29 at each longitudinal end thereof to racks 30 which extend to the exterior of the tank structure and which are provided with teeth 31 along their bottom surfaces. The teeth 31 are engageable with pinion gears 32 which are fixed upon a cross-bar 33 to rotate therewith. The cross-bar is also provided with a bevel gear arrangement 34 to allow it to be rotated in response to rotation of an actuating shaft 36. The actuating shaft extends upwardly through the side of the tank structure and through the upper wall of the tank, and has an upper end (FIG. 7) provided with a nut 37 so that the shaft may be rotated by means of a conventional wrench or the like to open the gate and allow the grain or feed to gravitate from the associated tank compartment. Alternatively, the cross-bar may be rotated by any suitable means to open the gate. As is apparent from the drawings, each of the tank compartments is separately provided with an identical rack, pinion and actuating shaft arrangement for opening and closing the gate 14 associated with the compartment.

As the material gravitates out of the compartment 12 through opening 28 in the tank structure, it is received by the conveyor system 16. This system is designed to propel the material continuously through the truck structure to one of the discharge locations, either the mechanical chute device 17 or the pneumatic discharge mechanism 18, where it can be unloaded and delivered to storage bins or the like. The conveyor system includes a U-shaped conduit 39 (FIGS. 2 and 3) which extends centrally of the tank structure and beneath each of the slidable gates 14. The conduit 39 terminates at the rear of the tank structure in a corner housing 40 (FIG. 4) which is generally semi-cylindrical in cross-section, is closed by suitable side walls, and is bolted at its forward edge to a reinforced section 41a of a panel 41 which extends transversely through the tank structure. Extending from the corner housing diagonally upwardly through wall 41 and centrally of the tank structure to the top forward portion of the tank is a second U-shaped conduit 42 which is similar in shape and function to the conduit 39. The conduit 42 extends through each of the partitions 13 by means of openings 43 formed therein. In order to prevent the grain material being moved upwardly within the conduit 42 from being mingled with the grain within the compartments 12 through which it passes, a triangular cover section 44 (FIG. 1) is placed over the conduit 42 to extend therewith diagonally through the tank structure. Both the cover section and the conduit 42 are secured, as by welding to the panel 41 (FIG. 4) which extends transversely across the lower rear corner of the truck and is fixed to the sloping sides 21a and 21b of the tank structure. At their upper ends, the conduit 42 and the cover section 44 terminate at a position spaced a short distance from the front wall 19 of the tank. A partition 47 is extended from the top of the conduit 42 to the front wall to serve as a grain deflector. Extending downwardly parallel to the front wall is a closed rectangular conduit section 48 which attached to the front wall by suitable means including a deflector flange 49 and is connected to the conduit 42 by a deflector partition 50. A pair of flat panels 51 are attached at the sides of the conduits 42 and 48 between the deflectors 47 and 50 and the front wall 19 to form a closed housing 46 to conduct the material between conduits 42 and 48. The closed conduit 48 extends downwardly to the conduit 39 and is joined therewith at the lower right hand corner of the tank structure as seen in FIGURE 2. The conduit 39, the rear corner housing 40, the forward housing 46, and the conduits 42 and 48 are thus seen to provide a continuous passageway through the tank.

The free flowing material from within the tank compartments is driven through the conduits 39, 42 and 48 by means of an endless chain conveyor 52 (FIG. 2) which is comprised of links 53 and a series of uniformly spaced paddle elements 54, each of the paddle elements being rectangular in cross-section and being formed with a flexible face plate 56 which is in wiping engagement with the U-shaped conduits 39 and 42 to propel the material therethrough. The chain conveyor 52, which is disposed in a triangular arrangement to follow the conduits 39, 42 and 48, is trained about sprocket members 57, 58 and 59 which are located at the corner points of the chain. Sprockets 57 and 58 are located at the forward end and the rearward end of the bottom conduit 39, respectively, and are both power driven, by means to be described later, to propel the chain and paddles. Sprocket 59, which is located in the top forward corner of the tank structure, is an adjustable idler sprocket whose sole function is to corner and tighten the conveyor. For this last purpose, the shaft 61, upon which sprocket 59 rotates, is made adjustable by means of a slotted guide member 62, as seen in FIG. 6.

Referring now particularly to FIG. 4 which illustrates generally the pneumatic discharge system 18, it is apparent that the rear corner housing 40 is provided with a movable closure member 63 which is arranged to be actuated to expose an opening 64 in the corner housing through which grain or the like, being propelled by the conveyor 52, will be discharged. In FIGURE 4, the closure member is shown in full in its removed or open position, while the closed position is depicted in phantom. The rear wall 20 of the tank is cut away at its lower central portion to provide a rectangular opening in which a pair of generally triangular flat panels 66 are positioned to abut against and be secured to the panel 41. Portions of the panels 66 extend rearwardly of the rear wall of the tank, and these portions are connected together by a cross member 67 which is bolted to the panels. The cross member is formed with a hinged access door 68 to provide access to space between the panels 66 for inspection purposes and to manipulate the closure member 63 of the corner housing. In order that the closure member 63 may be swung between open and closed positions, it is provided with a rod 69 upon which it is journalled and which extends through a pair of curved slots 71 formed in the panels 66. The exterior projecting portion of the rod contains a handle 72 for easy manipulation. Pivotally mounted on the central portion of the rod is a turnbuckle 73 having an attached stop 74 which is adapted to abut against a fixed pin 76 connected through and fixed to each of the panels 66. Thus, the stop will abut the pin to place the turn buckle in compression when the closure member is secured in its closed position in the corner housing. A latch 77 is provided on the exterior of one of the panels 66 (FIG. 8) to hold the closure member in its open position.

When it is desired to discharge from the conveyor system 16 into the pneumatic discharge system 18, therefore, the operator merely has to open the access door 68, unloosen the turnbuckle 73 from its tightened position against the pin 76 by giving it a few turns, grasp the handle 72 to slide the removable portion 63 up the slot 71, and lock the removable portion in place by means of the latch 77.

The pneumatic system 18, to which discharge through opening 64 will be directed, generally comprises an airlock 81 connected to a blower 82, the airlock being adapted to feed a flexible hose element 83 which may be used to direct the grain or similar discharge material to a proper storage location. The blower may be of any conventional power driven type adapted to supply a continuous source of air to the airlock which is located at the rear portion of the truck and bolted onto the truck frame 26. The airlock includes a driven shaft 84 mounted by bearings 86 in a cylindrical housing 87. The portion of the shaft within the housing has a drum 88 welded thereto for joint rotation, and the drum has a plurality of arms 89 extending from its outer periphery. Each of the arms has attached thereto a flexible blade 91 which is in sliding contact with the inner periphery of the cylindrical housing 87. The shaft 84 is driven by means of a power drive connection to a sprocket 90 fixed on one end of the shaft. The upper portion of the airlock housing is open at 92 to allow the loose bulk material to enter the airlock as it is propelled through the opening 64 by the conveyor. The housing is also provided with aligned ports 93 and 94 at opposite ends of its lower central section to which the flexible hose 83 and a hose 96 to the blower are connected, respectively.

When it is desired to discharge through the pneumatic system 18, the operator must first place the closure member 63 in the open position of FIG. 4 to allow the free-flowing material from the conveyor system 16 to be propelled into the airlock 81. Each pair of adjacent arms 89 and the associated blades 91 will segregate a charge of material and carry the charge around the inner periphery of the housing 87 until the charge is placed in line with the ports 93 and 94. At this time, the air stream from the blower will force the material into and through the flexible hose 83 which may be manually placed in various locations to facilitate the unloading operation, particularly when the place of final storage for the material is not easily reachable by a standard swingable chute and conveyor type of delivery means.

The second manner of discharging the material from the tank is by means of the mechanically operated chute 17 as best seen in FIG. 6. When it is desired to unload out of the chute, a hinged gate 97 which closes an opening 98 in the front wall 19 of the tank, is opened to allow the conveyor 52 to discharge into the chute. The chute and its manner of operation are similar to that shown and described in U.S. Patent No. 2,573,193 to Goldsberry. Positioned on the front upper edge of the tank structure is a generally cylindrical casing head 101 from which a flat sided conveyor head 102 is mounted by means of a swivel ring connection 103. Swingably mounted within the conveyor head is the discharge chute 17 which has therein the previously mentioned endless chain and paddle conveyor 17a which is similar in design to the conveyor 52. The conveyor 17a is trained on a driven sprocket 106 located within the conveyor head and an idler sprocket 106a at the discharge end of the chute. A hinged gate 107 mounted with a return spring 107a seals off the chute to prevent the discharged material from being lost yet allows the chute to be moved in a vertical arc to permit alternate positioning depending upon the elevation of the discharge point.

A mechanism is provided for lowering and raising the chute 17 which includes a cable 108 which is fastened at one free end to the chute at 109. The cable is trained over a double pulley 110 mounted on a swingable bracket 111, turned over guide pulley 112 mounted on the chute, trained over double pulley 110 and around guide pulleys 113, 114 and 115 where it is passed through a protective tube 116 which extends diagonally through the tank beneath the cover section 44. The other end of the cable is trained over a guide pulley 117 (FIG. 4) fixed on the panel 41 and is extended to a power winch and collecting drum mechanism 118 (FIG. 1) which is fixed to the exterior of the tank structure at the rear portion thereof to operate the cable and pulley system. The swingable bracket upon which the pulleys 110 and 113 are mounted is fixed to a pin 119 which is journalled on a bracket 121 for pivotable movement so that the chute may be swung laterally about a vertical axis through the swivel ring connection 103. This lateral movement may be accomplished manually merely by pushing against the extended chute. Also, a cable deflector 122 is provided on the chute to prevent the cable from becoming entangled when the chute is in its lowered position.

The gate 97, which opens the discharge chute 17 to receive feed from the conveyor 52, is operated by means of a lever 123 (FIG. 6) which is fixed on a shaft 123a which is secured to gate 97 and has end portions pivotally mounted in the casing head 101. The lever 123 is provided at its outer end with a return spring 124 which urges it to its lower position against stop 128 to close the opening 98 and seal off the discharge chute (such position being shown in phantom lines in FIG. 6). The outer end of the lever is also provided with a cable 125 which extends downwardly along the front of the tank to a position where it can be conveniently actuated by the operator to open the gate 97. The frame of the truck 26 is provided with a hook 126 (FIG. 2) to which the cable may be secured to hold the gate in its open position. Upon release of the cable from such hook, the return spring will serve to bring the gate back into its closed position.

The power system for operating the power driven mechanisms in the truck structure is best seen in FIGURE 9. A pair of flexible drive shafts 131 and 132 are supplied with power from a source such as a standard truck transmission having power take offs (not shown). The shaft 131 drives the blower 82 which supplies air under pressure to the airlock 81. Shaft 131 also is provided with a chain drive 133 to drive a flexible shaft 134 which is linked with a drive shaft 135 by means of chain drive 136, shaft 137, and a second chain drive 138. Drive shaft 135 is provided with a chain drive 139 to drive the sprocket 99 which is secured to the shaft 84 driving the airlock. The shaft 135 also is provided with a clutch 142 and a chain drive 143 for driving the main conveyor sprocket 58 through shafts 144 and 146 and gear box 147. The second flexible shaft 132 from the power source drives the main conveyor sprocket 57 through a gear box 148 and drive shaft 149, and it is also connected through the gear box 148 to a vertical flexible shaft 151 which is provided with a clutch 152 and right angle drive 153 for driving the discharge conveyor 17a through sprocket 106.

From the foregoing description, it is apparent that the present invention provides a bulk tank truck which has both a pneumatic discharge system and a mechanical conveyor and chute discharge system and that these discharge systems may be alternately operated in any easy and simple manner with a minimum of extra parts.

While one embodiment of the present invention has been shown and described, it will be understood that various changes and modifications may be made therein without departing from the spirit of the invention or the scope of the appended claims.

The invention having thus been described what is believed to be new and desired to be protected by Letters Patent is:

1. In a tank truck for the delivery of loose bulk material, a tank having a plurality of separate compartments therein, a gate at the bottom of each of said compartments, means for separately operating each of said gates, a first conduit section extending from the front to the rear of the tank beneath each of said gates, an enclosed upwardly inclined second conduit section extending from the front to the rear and from the top to the bottom of the tank, a first curved corner housing at the bottom of the tank for joining one end of said first and second conduit sections, an enclosed third conduit section extending vertically from the top to the bottom of said tank adjacent the other ends of said first and second conduit sections, a second curved corner housing joining said second and third conduit sections, an endless conveyor within said conduits, removable curved sections in each of said corner housings, each curved section being movable from a position in which it spans a discharge opening in the associated corner housing with its inner surface forming a wall of the housing to a position spaced outwardly from the opening to permit discharge of material therethrough, the curved section at said first corner housing forming a support surface for material being forced into said upwardly inclined conduit section by said endless conveyor, and means for effecting movement of each of said removable curved sections between said positions.

2. In a tank truck for the delivery of loose bulk material, a tank having a plurality of separate compartments therein, a gate at the bottom of each of said compartments, means for separately operating each of said gates, an upwardly inclined first conduit section extending from the front to the rear of the tank beneath each of said gates, an enclosed second conduit section extending from the front to the rear and from the top to the bottom of the tank, a first corner housing at the bottom of the tank for joining one end of said first to one end of said second conduit sections, an enclosed third conduit section extending vertically from the top to the bottom of said tank adjacent the other ends of said first and second conduit sections, a second corner housing joining said second and third conduit sections, an endless conveyor within said conduits, curved removable closure sections associated with each of said corner housings, each section being movable from a position in which it spans a discharge opening in the associate corner housing with its inner surface forming a wall of the housing to a position spaced outwardly from the opening to permit discharge of material therethrough, the curved section at said first corner housing forming a support surface for material being forced into said upwardly inclined conduit section by said endless conveyor, and means for effecting the removal and replaceemnt of each of said removable sections, a pneumatic discharge means adjacent said first corner housing for receiving and carrying away material discharged through the opening therein when the closure section has been removed and an adjustably positionable mechanical discharge chute adjacent said second corner housing for receiving and carrying away material discharged through the opening therein when the closure section has been removed.

References Cited by the Examiner

UNITED STATES PATENTS

| | | | |
|---|---|---|---|
| 442,159 | 12/90 | Wilde | 198—67 |
| 2,573,193 | 10/51 | Goldsberry | 214—521 |
| 2,701,073 | 2/55 | Padille | 214—521 |
| 2,758,732 | 8/56 | Herzog et al. | 214—521 X |
| 2,798,628 | 7/57 | Fisher | 214—519 |
| 2,926,963 | 3/60 | Dorey | 214—83.28 X |
| 1,255,426 | 6/60 | Hoffstetter | 214—83.2 |

FOREIGN PATENTS 1,255,426  1/61  France.

HUGO O. SCHULZ, *Primary Examiner.*

GERALD M. FORLENZA, *Examiner.*